United States Patent [19]

Smith

[11] 4,225,886
[45] Sep. 30, 1980

[54] VIDEO CAMERA CONTROL SYSTEM

[75] Inventor: William V. Smith, Memphis, Tenn.

[73] Assignee: Lectrolarm Custom Systems, Inc., Memphis, Tenn.

[21] Appl. No.: 22,505

[22] Filed: Mar. 21, 1979

Related U.S. Application Data

[63] Continuation-in-part of Ser. No. 851,812, Nov. 16, 1977, Pat. No. 4,152,696.

[51] Int. Cl.² ............................................. H04N 5/30
[52] U.S. Cl. ............................................. 358/210
[58] Field of Search ................ 358/185, 210; 352/179; 340/172, 147 MD, 162

[56] References Cited

U.S. PATENT DOCUMENTS 4,123,782  10/1978  Kitahara .............................. 358/210

Primary Examiner—Robert L. Griffin
Assistant Examiner—Michael A. Masinick
Attorney, Agent, or Firm—LeBlanc, Nolan, Shur & Nies

[57] ABSTRACT

A video camera control system is provided capable of selectively providing one of a plurality of control signals with each signal corresponding to a particular pre-designated function of a video camera. The output signals from the control system are generated in response to constant voltage input signals produced by an input circuit. The input circuit is coupled to a control circuit through a single transmission line over which different constant level voltage signals are transmitted. The voltage level of the input signal which is transmitted is selected from among a plurality of predetermined levels in dependence upon the control function to be achieved. The control circuit, in turn, receives the input signals and in response thereto will activate one of a plurality of switches for providing a corresponding output signal which serves to enable an appropriate camera function.

15 Claims, 8 Drawing Figures

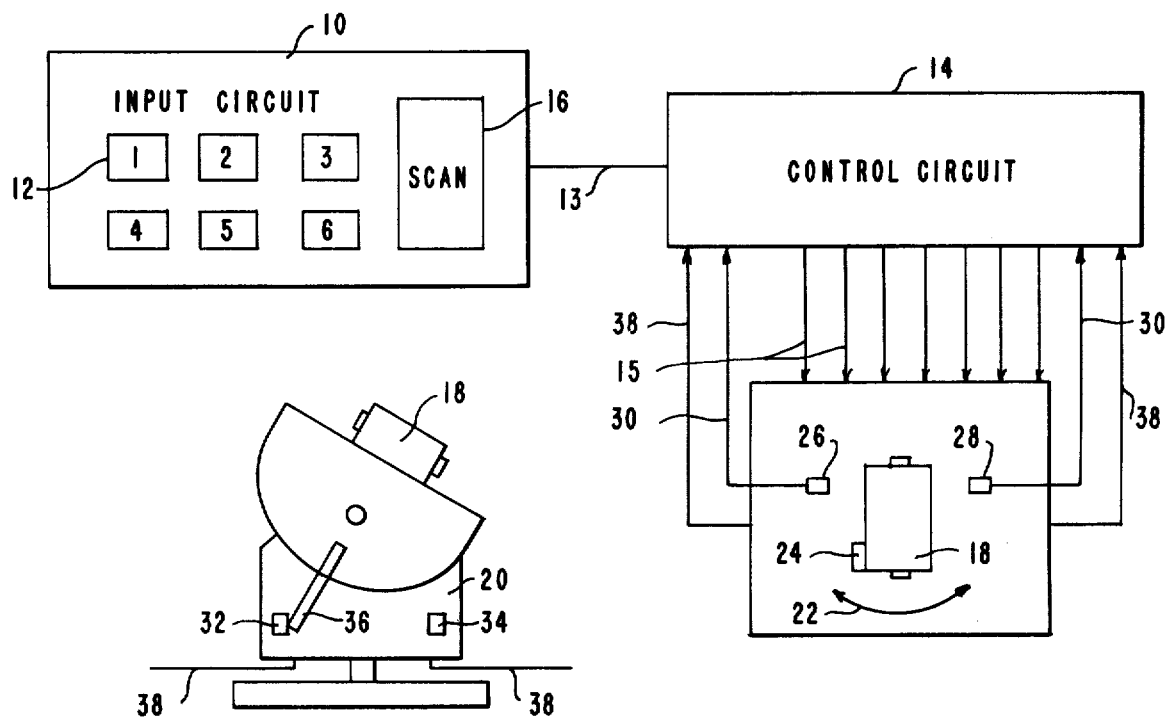
FIG. 1
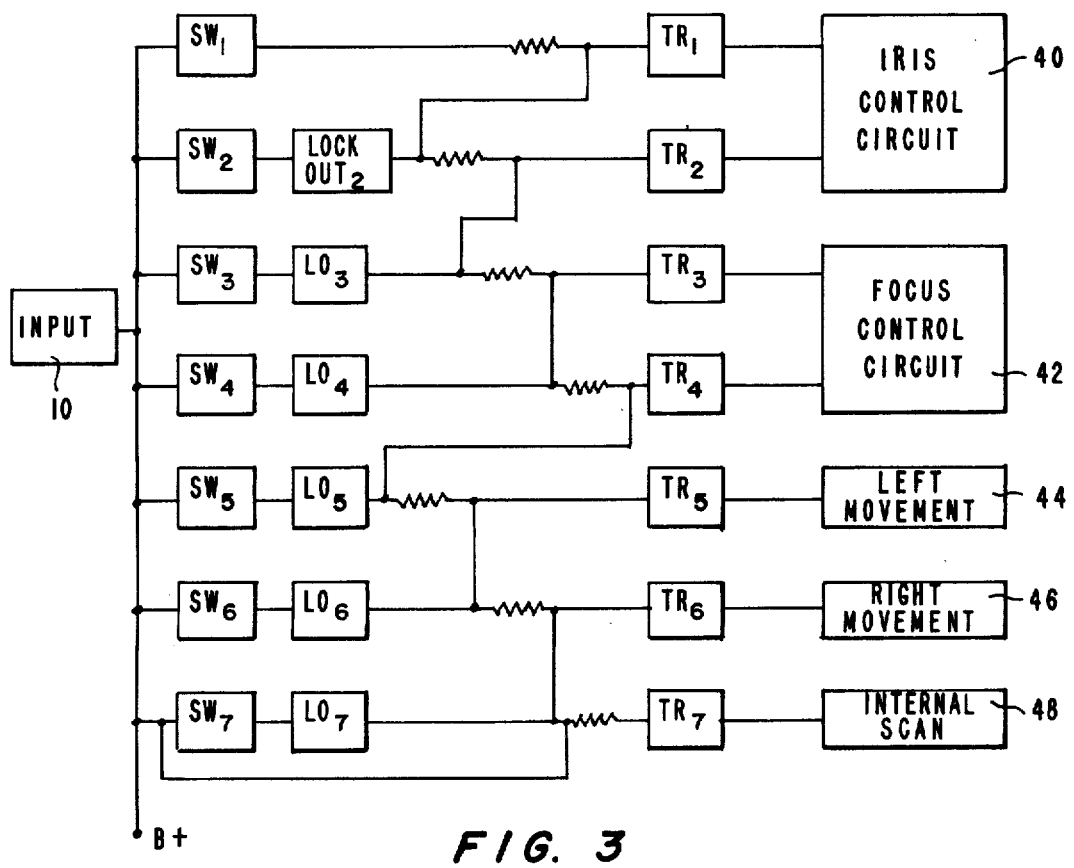
FIG. 2
FIG. 3

VIDEO CAMERA CONTROL SYSTEM

CROSS REFERENCE TO RELATED APPLICATION

This patent application is a continuation-in-part of co-pending U.S. patent application Ser. No. 851,812 entitled "Multi-Function Control Circuit", filed Nov. 16, 1977, now U.S. Pat. No. 4,152,696.

BACKGROUND OF THE INVENTION

The present invention involves a video camera control system for providing a plurality of control signals for selectively enabling a corresponding plurality of control functions in a video camera.

In the majority of the known control systems, where it is desired to selectively control a plurality of different functions, it is necessary that a different switch be included in the input circuit of the system for providing an appropriate signal for controlling each of these functions. Each of the signals is then coupled by a separate transmission line from the input circuit to the actual control circuit for activating the corresponding function. Representative embodiments of such systems are disclosed in U.S. Pat. Nos. 3,312,941 to Booth et al; 3,508,201 to Morale; 3,688,262 to Liquori and 3,719,828 to Lipskin. Since in each of these devices, there is almost an exact correspondence between the number of input selection members and the number of output functions that can be controlled by the system, there is a direct linear relationship between the control capability of the system and the size of the input device. Thus, as the intended use of the system expands, the size and cost of the control system expands at the same rate. Furthermore, since in each of these systems there is almost always a direct link, i.e., transmission line, between each of the input selecting members and the control circuit, it is difficult to separate the input circuit and the control circuit by any significant distance unless one is willing to utilize a large amount of wiring between the circuits.

The patent to Liquori is possibly of particular interest since the embodiment disclosed by this patent was designed for controlling a plurality of audio-visual devices, which is likewise an area in which the control system of the present invention can be of particular utility. In the system disclosed by the patent to Liquori each of the input buttons is directly connected by a separate line to a remote control assembly, which assembly provides an appropriate output signal that is supplied to each of the audio-visual devices to be controlled.

While several attempts have been made to limit the number of input selecting members which must be utilized in order to control a plurality of control functions, these systems have generally encountered problems of either simultaneously activating a plurality of control functions or entailing such a cumbersome method for avoiding such simultaneous activation that the system becomes impractical. Examples of such systems are disclosed in U.S. Pat. Nos. 3,050,713 to Harmon and 3,569,741 to Bolick et al.

The patent to Harmon discloses a circuit having a plurality of thyratrons that are selectively activated based upon the level of the signal supplied to a signal source. Each of the thyratrons is activated only when an applied input signal is above a corresponding predetermined level. When the thyratron is activated, it generates an output signal for enabling a corresponding control function. Thus, for each control function to be activated by the control circuit, it is necessary to have a separate thyratron. In order to prevent simultaneous actuation of more than one thyratron at a time, a plurality of delay circuits is employed. These delay circuits are coupled with the thyratron such that the thyratron which is activated by the lowest level signal is not activated until the longest delay period has passed. Thus the higher the level of the signal, the shorter the time period that signal is applied while conversely the lower the level, the longer the time period the signal is applied. The duration of the applied signals are selected so as to correspond with the delay circuits coupled to the thyratrons so that the signal only exists long enough to activate the appropriate thyratron.

The patent to Bolick et al discloses a control circuit for selectively activating different operations within a recording device. The circuit includes a plurality of transistors, each of which is activated when the voltage applied to its base is above a predetermined level. In the system disclosed by this patent, if the level of the applied voltage is sufficient to activate the third level transistor, then the first and second level transistors will be simultaneously actuated.

One other control circuit which has been developed in the prior art is that shown in U.S. Pat. No. 3,670,180 to Grossimon et al. In contrast to the systems disclosed in the other patents, however, in accordance with the embodiment disclosed by this patent a plurality of SCRs are sequentially activated by a series of input signals. The values of the input signals sequentially increase and each of the signals serve to actuate a corresponding SCR. The purpose of the control system disclosed by this patent is to fire a series of rockets in a predetermined order and thus the SCRs need only be actuated in accordance with this predetermined order and it is impossible to selectively actuate the SCRs in any other order.

All the systems disclosed by the patents discussed above involve extremely sophisticated and cumbersome circuitry for carrying out a plurality of control functions. If only a relatively few functions are to be controlled by the system, the utilization of separate circuits for each function may not present a significant burden. As the number of functions to be controlled grows, however, the size of the system grows at the same rate thereby increasing the complexity and cost of the system.

Considering the references cited in applicant's co-pending U.S. Patent Application cited above, U.S. Pat. No. 3,932,714 to Guimier et al discloses a remote electrical transmission system in which a control unit provides a different level voltage output, in dependence upon the position of a selector switch, to a receiver unit including a plurality of zener diodes and associated switching transistors which open or close different control circuits according to the positions in which the control selector switch is set. U.S. Pat. No. 4,028,620 to Kitagawa et al discloses a system for selectively actuating electrical loads including an instruction unit having a switch mechanism with a plurality of contacts, and an output unit for generating respective output signals corresponding to the voltage signals from the instruction unit. U.S. Pat. No. 4,070,650 to Ohashi et al discloses a digital signal transmission system in which control signals are either transmitted or not transmitted in accordance with the results of a comparison between set values stored in a decoder and digital signals transmitted from an encoder. When the values of the digital signals are greater than the value set in the decoder comparators output signals are generated. The output signals are suspended if the values of the digital signals are smaller than those set in the decoder comparators. Clearly, none of these references disclose or suggest the advantageous arrangement of switch devices and associated blocking devices employed in the present invention to control the functions of a video camera system.

SUMMARY OF THE INVENTION

An object of the present invention is to provide a multi-function control system for a video camera that overcomes the drawbacks of previously known systems as discussed above.

Another object of the present invention is to provide a multi-function control system for selectively enabling one of a plurality of control functions of a video camera in response to a single input signal.

A further object of the present invention is to provide a video camera control system for selectively enabling a plurality of camera functions in response to a signal received from an input circuit with the control circuit and input circuit being interconnected by a single transmission line.

Still another object of the present invention is to provide a video camera control system for selectively enabling a plurality of control functions of a video camera with each control function being actuated in response to a different level voltage applied to the control circuit from an input circuit.

Still a further object of the present invention is to provide a video camera control system for selectively providing a plurality of output signals to control the functions of a video camera, with each output signal being dependent upon the level of a voltage signal applied within this system, by utilizing a plurality of zener diodes each having a different breakdown voltage so that when each zener diode breaks down, it provides a corresponding output signal.

These objects are accomplished in accordance with the present invention by the utilization of a control circuit having a plurality of zener diodes with each zener diode having a different breakdown voltage so that each is actuated in dependence upon a different level input signal. The actuation of each higher level zener diode also generates a corresponding blocking signal for blocking the output of the next lower level zener diode so that only a single output signal is generated by the system. The input signals to the system are generated by an appropriate input circuit which is capable of providing a constant level voltage with the level of the voltage varying in dependence upon which zener diode is to be activated. The input circuit is coupled to the control circuit through a single transmission line over which the constant level voltage is sent to all of the zener diodes of the control circuit.

More specifically, the present invention involves a video camera control system for selectively providing a plurality of control signals, one at a time with each signal serving to enable a separate control function to operate a video camera capable of a plurality of different functions. The selection of the control signals depends upon input signals which are received from an input circuit. Each of the input signals has a constant voltage and the level of the input signal is selected from a plurality of predetermined levels. These input signals are provided to a plurality of zener diode switches. Each of the zener diode switches is activated when the input signal is above a corresponding predetermined level with the predetermined level for each of these zener diodes being different from the level necessary for activating the other zener diodes. Thus, each zener diode which has been actuated provides an appropriate switching signal. The output from each of the zener diodes is in turn coupled to a transistor switching circuit. The output of each zener diode, except for that zener diode corresponding to the lowest voltage level, is also coupled to a lockout circuit which provides a blocking signal when activated. This blocking signal from the lockout circuit is applied to the output of the next lowest level zener diode for blocking that output from reaching the corresponding transistor switching circuit. Thus, if the third level zener diode is actuated, although the first and second level zener diodes are also actuated, the lockout circuits block the outputs of those zener diodes from reaching their corresponding transistor switching circuits. Hence, the only transistor switching circuit to receive a signal would be the third level transistor circuit. An output circuit is coupled to each of the transistor switching circuits and in response to a signal from the transistor switching circuits enables one of the control functions of the video camera.

The control system of the present invention can be advantageously utilized in connection with controlling a video camera unit and associated equipment within the area surrounding the location of the unit. For example, the control system can be used for controlling the doors opening into the area or turning on and off the lights. The system is especially suitable for controlling various movements of the camera such as panning and tilting and for controlling the iris, focus and zoom functions of the camera. The system can also be adapted to achieve automatic positioning of the camera in a plurality of predetermined positions in response to the different level voltage input signals.

BRIEF DESCRIPTION OF THE DRAWINGS

FIG. 1 is a basic block diagram circuit illustrating the input and control circuits for a video camera control system embodying the principles of the present invention.

FIG. 2 is an elevation view of a swivel and tilt mounting unit used to support the video camera.

FIG. 3 is a more detailed block diagram circuit of the input and control circuits of the present invention.

DESCRIPTION OF THE PREFERRED EMBODIMENT

Figure 4:
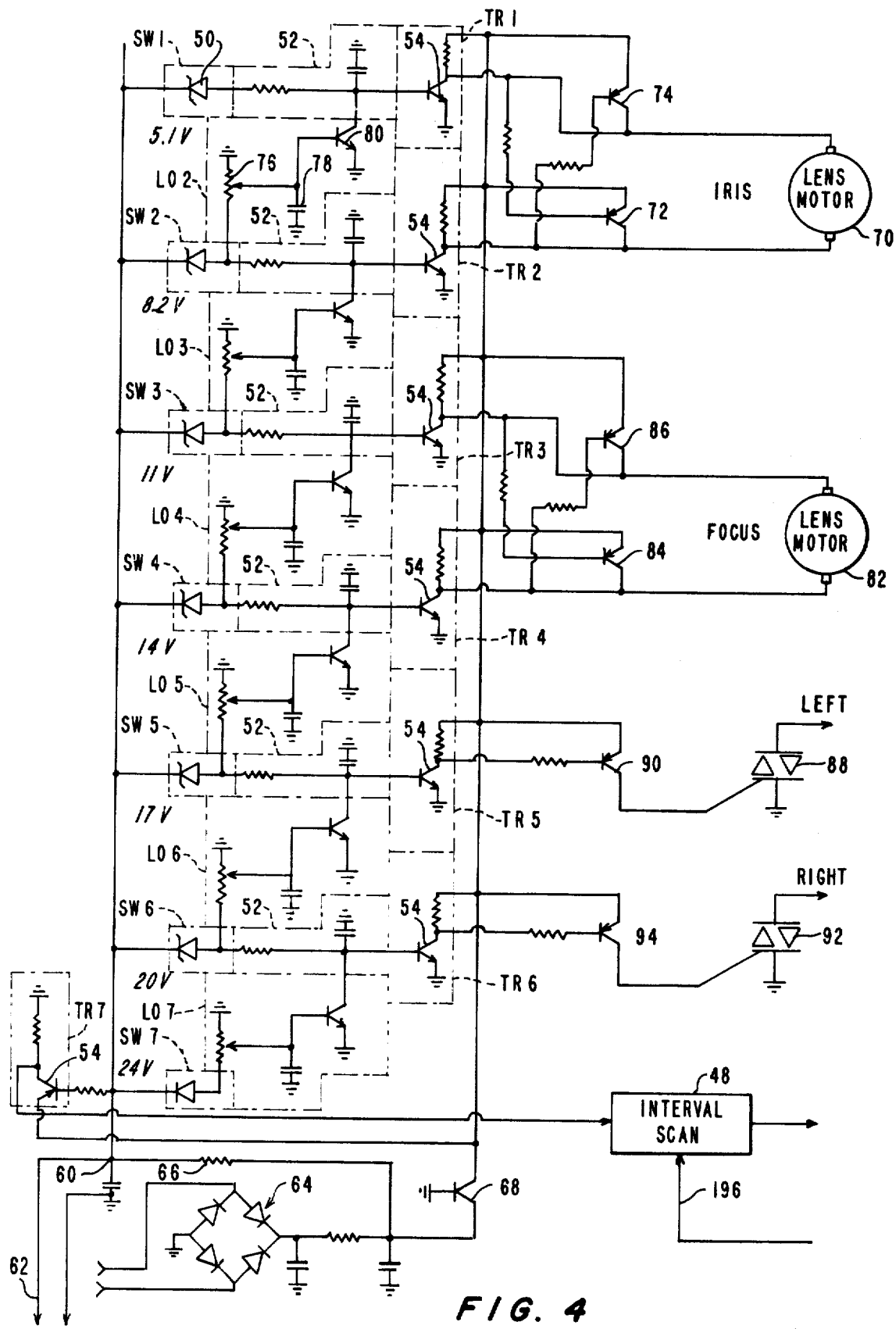
FIGS. 4–6 are schematic diagrams illustrating the components of the control circuits used to actuate the various functions of a video camera.

As shown in FIG. 1, the control system includes two basic circuits, an input circuit 10 and a control circuit 14. The input circuit provides a plurality of constant voltage level signals through transmission line 13 to control circuit 14. In the illustrated embodiment, input circuit 10 is capable of providing seven different voltage signals. The particular signal which is applied is dependent upon which of a plurality of buttons 12 or scan button 16 is pressed. Thus, the operator of the system presses one of the buttons which then provides an appropriate signal to the control circuit. The control circuit, in dependence upon the input signals that are received, provides an output signal along one of its output lines 15 to selectively actuate various control functions of a video camera 18.

Referring to FIGS. 1 and 2, video camera unit 18 is mounted on a rotatable pedestal 20 for rightward and leftward movement as indicated by arrow 22. A magnet 24 is mounted for movement with camera unit 18 to actuate a pair of magnetically operated position sensing switches 26 and 28 to provide position feedback signals to control circuit 14 via a pair of input lines 30 to indicate right and left camera orientation. The video camera unit also includes a pair of position sensing switches 32 and 34 (FIG. 2) e.g., microswitches, actuated by a lever 36 on the camera tilt mechanism to provide position feedback signals to control circuit 14 via a pair of input lines 38 to indicate the up or down orientation of the camera.

As shown in FIG. 3, each of the signals from input circuit 10 is provided to switching circuits SW-1 through SW-7. Each of these switching circuits is actuated only when the applied voltage is above a certain predetermined level with the predetermined level associated with each switching circuit being different. In the embodiment being shown in FIG. 4, each of the switching circuits is shown to be a zener diode with each zener diode having a different breakdown voltage. In the embodiment illustrated, the breakdown voltage for each of the zener diodes is shown next to the diode. Each of the diodes only passes current when the applied voltage exceeds its breakdown voltage. Thus if a voltage in excess of 11 volts is applied, then the first three zener diodes will all conduct current, i.e., switches SW-1, SW-2 and SW-3 will be actuated. The outputs from each of switches SW-1 through SW-6 is in turn coupled to a corresponding transistor switching circuit, TR-1 through TR-6. The input to switch SW-7 is also applied to transistor switching circuit TR-7.

In the case of the outputs from switching circuits SW-2 through SW-7, the output signal is first fed through a corresponding lockout circuit, LO-2 through LO-7. Each of the lockout circuits upon being actuated provides an appropriate blocking signal which is applied for blocking the output signal from the next lowest level switching circuit. In this manner, only signals from the highest level switching circuit that is actuated pass through to the corresponding transistor switching circuit. In turn, the actuated transistor switching circuit when actuated provides a corresponding output signal.

The output signals from transistor switching circuits TR-1 and TR-2 are applied to an iris control circuit 40 to control the opening and closing of the aperture of the camera lens. Similarly, the output signals from transistor switching circuits TR-3 and TR-4 are applied to a focus control circuit 42 to control the focus of the camera lens. The output of transistor switching circuit TR-5 is applied to an output circuit 44 to control leftward movement of camera 18, while the output of transistor switching circuit TR-6 is applied to an output circuit 46 to control rightward movement of the camera. The output signal produced by transistor switching circuit TR-7 is applied to an output circuit 48 which initiates an automatic scan function for the camera at predetermined intervals.

Referring to FIG. 4, there is an exemplary embodiment of the circuitry that can be utilized in carrying out the present invention. As previously described, each of the switching circuits, SW-1 through SW-7, includes a zener diode 50. Referring to first switching circuit SW-1, it is seen that the output of the zener diode 50 is supplied to transistor switching circuit TR-1 after passing through an R-C time constant circuit 52. The time constant circuit allows any transients in the signal to be eliminated prior to applying the signal to the base of a transistor 54 of transistor switching circuit TR-1. A high gain transistor can be used for transistor 54. Similarly, each transistor switching circuit TR-2 through TR-6 is operable by its respective switching circuit SW-2 through SW-6. In the case of switching circuit SW-7, however, transistor switching circuit TR-7 is coupled to the input of switching circuit SW-7.

Each zener diode 50 of switching circuits SW-1 through SW-7 is coupled to a common input point 60 which receives voltage signals via a conductor 62 from the input circuit. A full wave rectifier circuit 64 produces a DC operating voltage which is applied via a resistance 66 to input point 60. The DC voltage is also employed as a bias for transistor switching circuits TR-1 through TR-7 via a bipolar transistor 68.

The iris control circuit includes a lens motor 70 (FIG. 4) for controlling the size of the lens aperture in the camera and a pair of transistors 72 and 74 operable by transistor switching circuits TR-1 and TR-2, respectively. Normally, transistor switches TR-1 and TR-2 are non-conducting to apply equal bias voltages to both inputs of lens motor 70. When the input voltage at point 60 equals or slightly exceeds 5.1 volts, the breakdown voltage of the first zener diode in switching circuit SW-1, transistor switching circuit TR-1 is rendered conductive to ground the corresponding input of lens motor 70 and actuate transistor 72 to drive the lens motor in a predetermined direction to change the size of the lens aperture. If the voltage signal applied by the input circuit to point 60 equals or slightly exceeds 8.2 volts, the breakdown voltage of the second zener diode in switch SW-2, then the current that passes through that zener diode will supply a signal through lockout circuit LO-2 which serves to block the output of switching circuit SW-1 from activating transistor switching circuit TR-1. The lockout circuit includes a bias resistor 76 and a capacitor 78 which form an R-C time constant for a transistor 80 of the lockout circuit. As a result, only transistor switching circuit TR-2 is rendered conductive to ground the other input of lens motor 70 and actuate transistor 74 to drive the lens motor in the opposite direction.

Similarly, the focus control circuit includes a lens motor 82 (FIG. 4) for controlling the focus of the camera lens and a pair of transistors 84 and 86 operable by transistor switching circuits TR-3 and TR-4, respectively. The operation of the focus control circuit is substantially identical to the operation of the iris control circuit described above. When the input voltage at point 60 equals or slightly exceeds 11 volts, lens motor 82 is driven in a predetermined direction to change the focus of the camera, and when the input voltage equals or slightly exceeds 14 volts, the lens motor is driven in the opposite direction.

Leftward movement of the camera is controlled by a triac 88 having its gate electrode coupled via a transistor 90 to the output of transistor switching circuit TR-5. Similarly, rightward movement of the camera is controlled by a triac 92 having its gate electrode coupled via a transistor 94 to the output of transistor switching circuit TR-6. When the input voltage at point 60 equals or slightly exceeds 17 volts, the zener diode of switching circuit SW-5 breaks down to actuate transistor switching circuit TR-5 to drive transistor 90 into conduction and apply an enabling signal to the gate electrode of triac 88 which activates a camera drive mechanism (not shown) to turn the camera leftward. Similarly, when the input voltage at point 60 equals or slightly exceeds 20 volts, triac 92 is actuated to operate the camera drive mechanism to turn the camera.

Preferably, interval scan control circuit 48 (FIG. 4) may be incorporated in the video camera control system. The scan control circuit is actuated by transistor switching circuit TR-7 and it is designed to automatically advance the camera through a predetermined sequence of positions at predetermined time intervals and to stop the camera at a predetermined rest position between the scan intervals. If the input voltage at input 60 equals or slightly exceeds 24 volts, transistor switching circuits TR-1 through TR-6 are blocked and transistor switching circuit TR-7 is activated to operate the automatic scan control circuit.

Figure 5:
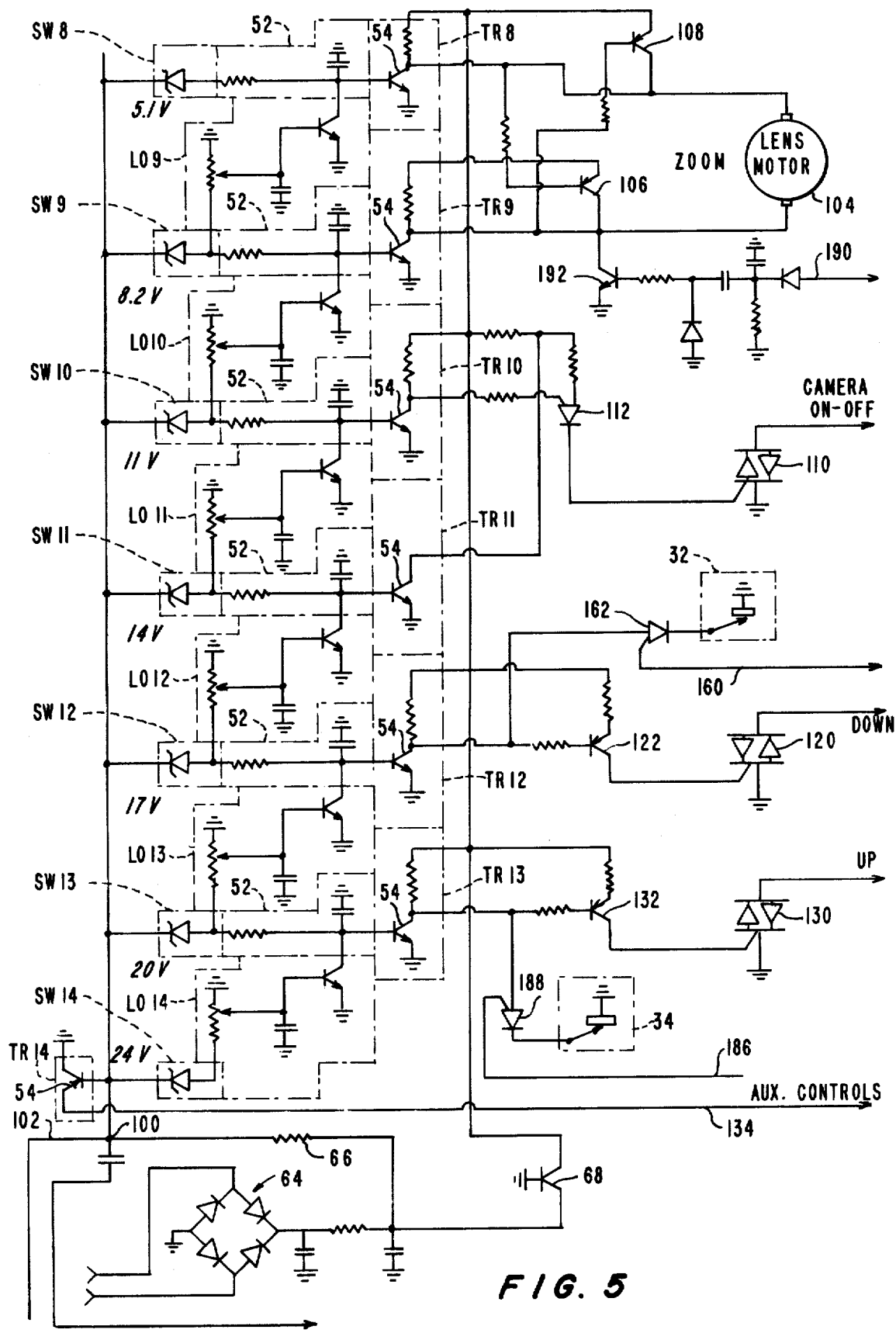

Referring to FIG. 5, the control circuit preferably incorporates additional switching circuits SW-8 through SW-14, lockout circuits LO-9 through LO-14, and transistor switching circuits TR-8 through TR-14 to control additional camera functions. Each zener diode of switching circuits SW-8 through SW-14 is coupled to a common input point 100 which receives voltage signals via a conductor 102 from the input circuit. A DC operating voltage is applied from rectifier circuit 64 via resistance 66 to input point 100 and is also employed as a bias for transistor switching circuits TR-8 through TR-14 via bipolar transistor 68.

A zoom control circuit includes a lens motor 104 (FIG. 5) for controlling the zoom function of the camera and a pair of transistors 106 and 108 operable by transistor switching circuits TR-8 and TR-9, respectively. The operation of the zoom control circuit is substantially identical to the operation of the iris and focus control circuits described above.

The camera on and off functions are controlled by a triac 110 having its gate electrode coupled to the output electrode of a silicon controlled rectifier 112. The gate electrode of SCR 112 is coupled to the output of transistor switching circuit TR-10 and its input electrode is coupled to the output of transistor switching circuit TR-11. When the input voltage at point 100 equals or slightly exceeds 11 volts, triac 110 is actuated to turn on the camera. However, when the input voltage equals or slightly exceeds 14 volts, triac 110 is unactuated to turn off the camera.

The downward movement of the camera is controlled by a triac 120 having its gate electrode coupled via a transistor 122 to the output of transistor switching circuit TR-12. Triac 120 actuates a camera tilt mechanism to move camera 18 downward when the input voltage at point 100 equals or slightly exceeds 17 volts. Similarly, upward movement of the camera is controlled by a triac 130 having its gate electrode coupled via a transistor 132 to the output of transistor switching circuit TR-13. Triac 130 actuates the camera tilt mechanism to move the camera upward when the input voltage equals or slightly exceeds 20 volts.

The output of the transistor switching circuit TR-14 may be applied via a conductor 134 to other equipment external to the video camera unit to provide additional auxiliary controls. For example, this output may be used to control doors opening into the area where the camera is located or to control lights in the area. Transistor switching circuit TR-14 actuates the auxiliary controls when the input voltage at point 100 equals or slightly exceeds 24 volts.

Figure 6:
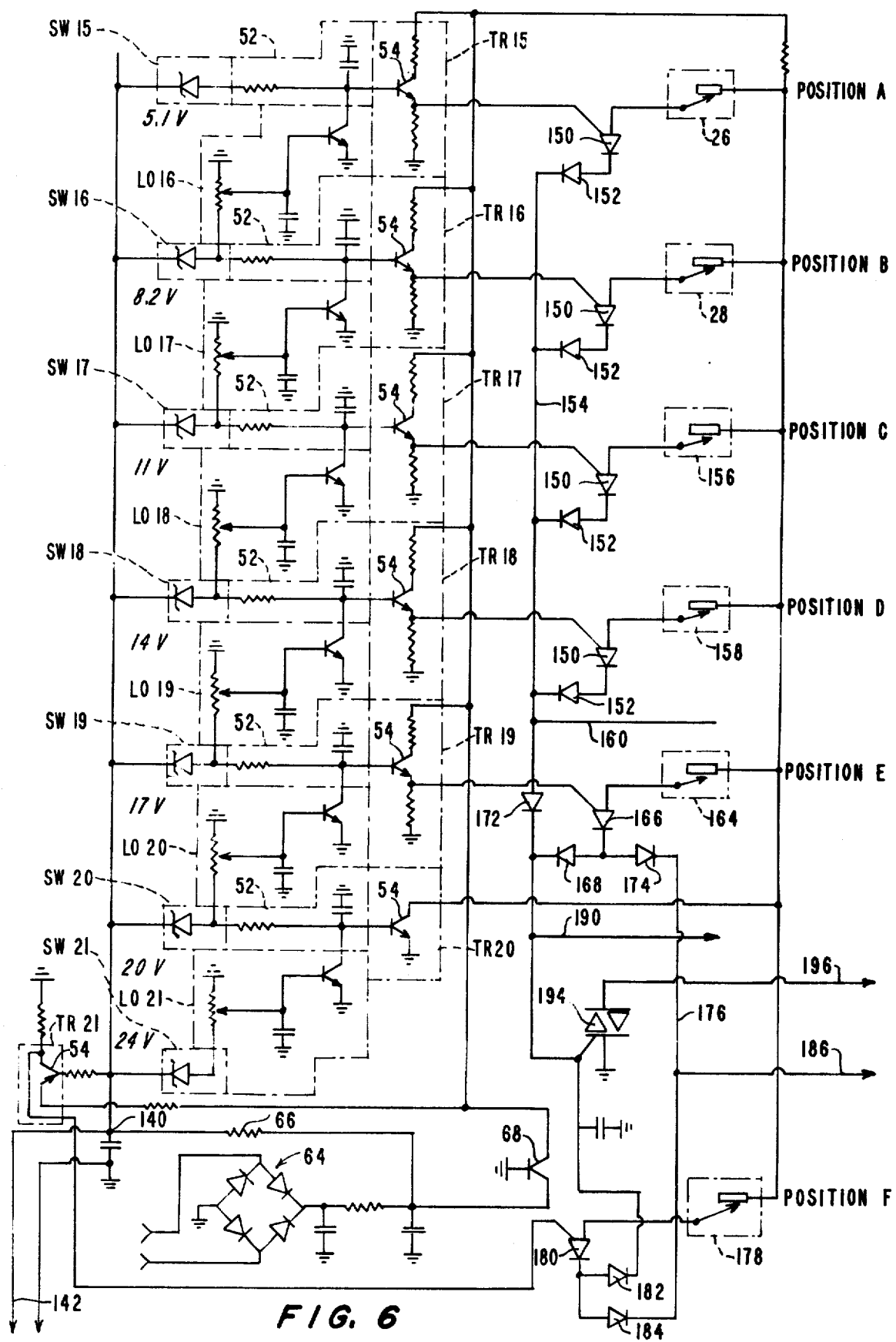

Referring to FIG. 6, an additional control circuit may be provided which serves to automatically position the camera in a plurality of predetermined positions designated A through F. The position control circuit includes a plurality of switching circuits SW-15 through SW-21, lockout circuits LO-16 through LO-21, and transistor switching circuits TR-15 through TR-21. Each zener diode of switching circuits SW-15 through SW-21 is coupled to a common input point 140 which receives voltage signals via a conductor 142 from the input circuit. The DC operating voltage produced by full wave rectifier circuit 64 is applied via resistance 66 to input point 140 and is also employed as a bias for the transistor switching circuits via bipolar transistor 68.

In the position control circuit of FIG. 6, position sensing switch 26 corresponding to position A is coupled to the input electrode of a SCR 150 having its gate electrode coupled to the output of transistor switching circuit TR-15 and its output electrode coupled via a diode 152 to a control conductor 154. Similarly, position sensing switch 28 corresponding to position B is coupled to a corresponding SCR 150 and diode 152 associated with transistor switching circuit TR-16. Additional magnetically operated position sensing switches 156 and 158 corresponding to positions C and D, respectively, are each connected to a corresponding SCR 150 and diode 152 associated with transistor switching circuits TR-17 and TR-18, respectively. Preferably, position sensing switches 26, 28, 156 and 158 are normally closed. Control conductor 154 is coupled via a conductor 160 to a SCR 162 (FIG. 5) which is connected to normally closed microswitch 32 to automatically move the camera downward when position A, B, C or D is selected.

The position control circuit (FIG. 6) also includes a normally closed, magnetically operated position sensing switch 164 corresponding to position E coupled to the input electrode of a SCR 166 having its gate electrode coupled to the input electrode of a SCR 166 having its gate electrode coupled to the output of transistor switching circuit TR-19 and its output electrode coupled via a diode 168 to a control conductor 170 isolated by a diode 172 from control conductor 154. The output electrode of SCR 166 is also coupled via a diode 174 to a control conductor 176. Similarly, a normally closed, magnetically operated position sensing switch 178 corresponding to position F is coupled to the input electrode of a SCR 180 having its gate electrode coupled to the output of transistor switching circuit TR-21 and its output electrode coupled via a diode 182 to control conductor 170. The output electrode of SCR 180 is also coupled via a diode 184 to control conductor 176. When either position E or position F is selected, control conductor 176 provides an output signal via a conductor 186 which is applied to the gate electrode of a SCR 188 (FIG. 5) having its output electrode coupled to normally closed microswitch 34 to drive the camera to a predetermined upward position.

Preferably, the position control circuit is arranged to automatically actuate the zoom function of the camera. When any of positions A through F are selected, control conductor 170 (FIG. 6) applies an output signal via a conductor 190 to a transistor 192 (FIG. 5) coupled to one input of lens motor 104 to select a predetermined zoom position. Transistor switching circuit TR-20 serves as an emergency switch to ground all of the position sensing switches when switching circuit SW-20 is actuated.

The position control circuit (FIG. 6) also includes a triac 194 having its gate electrode coupled to control conductor 170. Triac 192 provides an automatic pan control signal via a conductor 196, when any of positions A through F are selected, which is applied to interval scan control circuit 48 to stop the camera at the predetermined positions.

Figure 7:
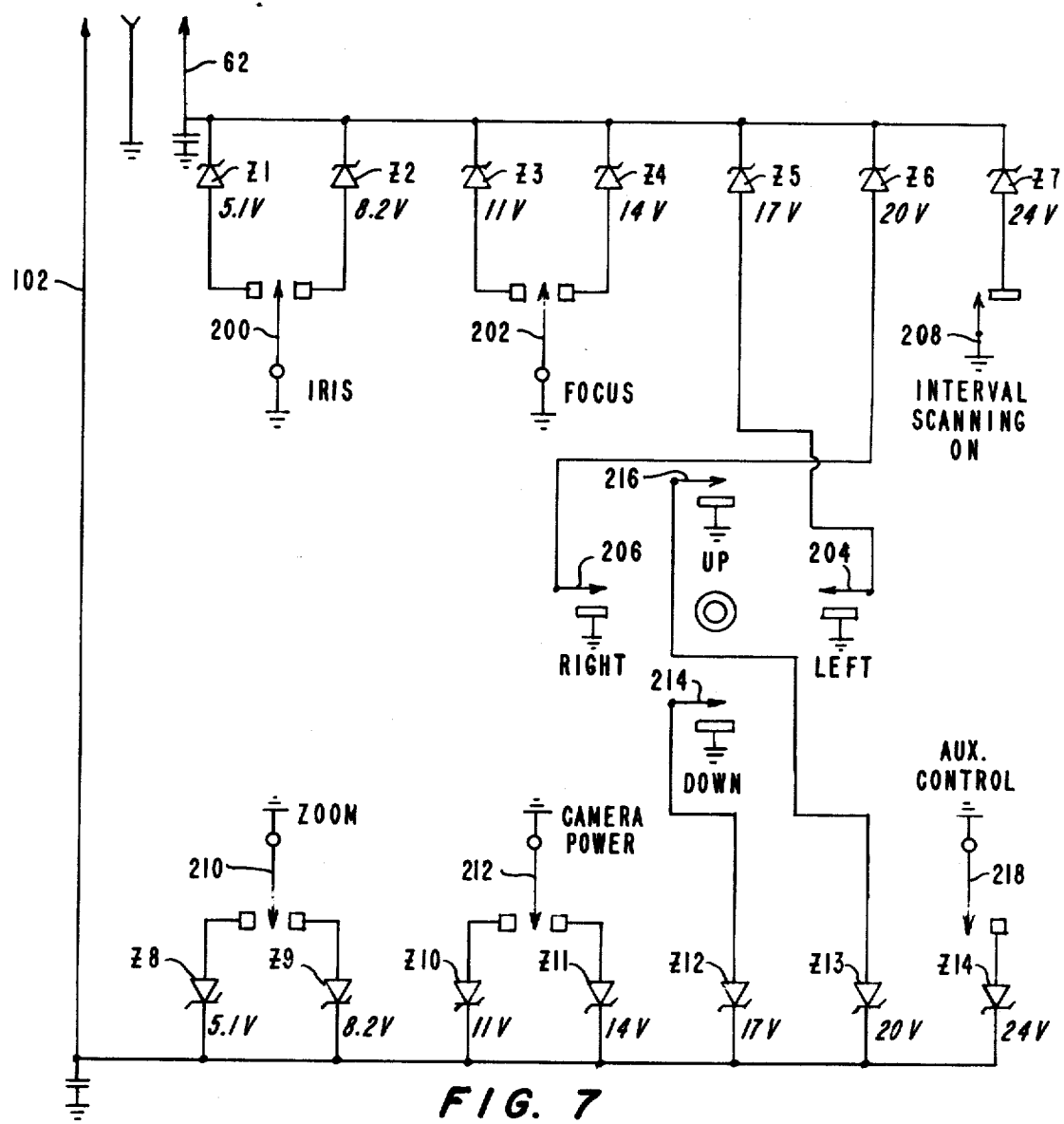
FIGS. 7 and 8 are schematic diagrams illustrating the components of the input circuits of the video camera control system.

Referring to FIG. 7, the input circuit of the video camera control system includes a first set of zener diodes Z-1 through Z-7 connected to control conductor 62. Each zener diode Z-1 through Z-7 has the same breakdown voltage as the corresponding zener diodes of switching circuits SW-1 through SW-7, respectively. The input circuit includes an iris control switch 200 for selectively connecting zener diodes Z-1 and Z-2 to ground. Similarly, the input circuit includes focus control switch 202 for selectively connecting zener diodes Z-3 and Z-4 to ground. A left control switch 204 and a right control switch 206 are provided to selectively connect zener diodes Z-5 and Z-6 to ground, while an interval scanning switch 208 is provided to selectively connect zener diode Z-7 to ground. When any of the control switches is actuated, the DC voltage produced by rectifier circuit 64 is applied across the corresponding zener diode to cause the diode to breakdown to apply a predetermined input voltage on control conductor 62 to operate the control circuit of FIG. 7.

As shown in FIG. 7, the input circuit includes a second set of zener diodes Z-8 through Z-14 connected to control conductor 102, each having the same breakdown voltage as the corresponding zener diodes of switching circuits SW-8 through SW-14, respectively. The input circuit includes a zoom control switch 210 for selectively connecting zener diodes Z-8 and Z-9 to ground. Similarly, a camera power switch 212 is provided for selectively connecting zener diodes Z-10 and Z-11 to ground. The input circuit also includes a down control switch 214 and an up control switch 216 for selectively connecting zener diodes Z-12 and Z-13 to ground. When any of zener diodes Z-8 through Z-14 are connected to ground, the DC operating voltage produced by rectifier circuit 64 causes the zener diode to break down to apply a predetermined input voltage on control conductor 102 to operate the control circuit of FIG. 5.

Figure 8:
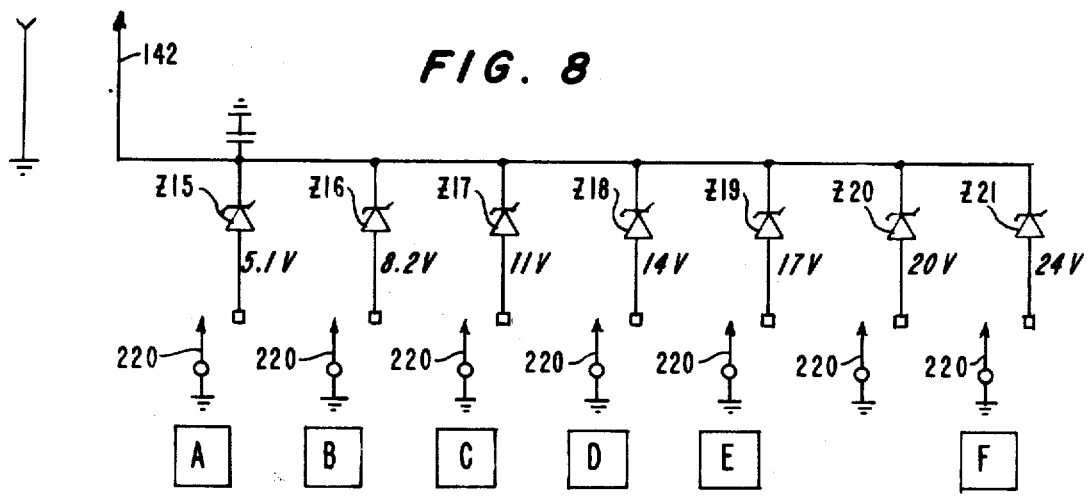

As shown in FIG. 8, the input circuit includes a third set of zener diodes Z-15 through Z-21 coupled to control conductor 142, each having the same breakdown voltage as the corresponding zener diode of switching circuits SW-15 through SW-21, respectively. A plurality of control switches 220 corresponding to predetermined positions A-F is provided for selectively connecting diodes Z-15 through Z-19 and Z-21 to ground. An additional switch 220 is provided to selectively connect zener diode Z-20 to ground in an emergency condition. When one of zener diodes Z-15 through Z-21 is connected to ground, the DC operating voltage produced by rectifier circuit 64 causes the zener diode to break down to apply a predetermined input voltage on control conductor 142 to operate the control circuit of FIG. 6.

It is noted that the above description and the accompanying drawings are provided merely to present an exemplary embodiment of the present invention and that additional modifications of such embodiment are possible within the scope of this invention without deviating from the spirit thereof.

I claim:

1. A video camera control system for selectively providing a plurality of control signals, one at a time with each signal serving to enable a separate control function of a video camera capable of a plurality of different functions, said system comprising:
   (a) input means for providing a plurality of different level voltage signals;
   (b) a plurality of first switch means coupled to receive the voltage signals from said input means, each of said first switch means being activated when the voltage signal is above a corresponding predetermined level with the predetermined level for each of said first switch means being different and each of said first switch means providing at its respective output a first switching signal upon being activated;
   (c) a plurality of blocking means, each being coupled to the output of a respective one of said first switch means except for said first switch means corresponding to the lowest level input signal, and each of said blocking means providing a blocking signal upon receiving a first switching signal from the corresponding said first switch means;
   (d) a plurality of second switch means, each being actuated by a corresponding one of said first switch means and said blocking means associated with said first switch means that is to be activated by the next higher level input signal, each of said second switch means providing at its output a second switching signal upon receiving a first switching signal from the corresponding said first switch means unless said second switch means also receives a blocking signal from the associated said blocking means; and,
   (e) a plurality of output means for selectively controlling the different functions of the video camera, each of said output means being coupled to the output of one of said second switch means and enabling one of the control functions of the video camera when receiving a second switching signal from the corresponding said second switch means.

2. A system as defined in claim 1, wherein each of said first switch means includes:
   a zener diode having a predetermined breakdown switch voltage with such breakdown voltage of said zener diode being different from the breakdown voltage of said zener diodes of the other of said first switch means such that when said first switch means receives an input signal above the predetermined breakdown voltage of the corresponding said zener diode said first switch means will provide a first switching signal.

3. A system as defined in claim 2, wherein each of said second switch means includes:
   a high gain transistor circuit with a predetermined time constant for eliminating transient oscillations prior to activation of said transistor.

4. A system as defined in claim 1, wherein said output means includes:
   a plurality of reversible drive motors, each operable by a respective pair of said second switch means for controlling the iris, focus and zoom functions of the video camera.

5. A system as defined in claim 1, wherein said output means includes:
a pair of gate devices individually operable by a corresponding pair of said second switch means for controlling right and left movements of the video camera.

6. A system as defined in claim 5, wherein:
each of said gate devices comprises a triac having its gate electrode coupled to the output of a respective one of said second switch means.

7. A system as defined in claim 1, wherein said output means includes:
a pair of gate devices operable by a corresponding pair of said second switch means for controlling up and down movements of the video camera.

8. A system as defined in claim 7, wherein:
each of said gate devices comprises a triac having its gate electrode coupled to the output of a respective one of said second switch means.

9. A system as defined in claim 1, wherein said output means includes:
a triac having its gate electrode coupled to the output of one of said second switch means for controlling the on and off operation of the video camera.

10. A system as defined in claim 1, wherein said output means includes:
a plurality of gate devices each operable by a respective one of said second switch means and a plurality of position sensing switches each coupled to a respective one of said devices and operable upon movement of the video camera into a predetermined position for selectively positioning the video camera in a plurality of predetermined positions in response to the different voltage signals.

11. A video camera control system for selectively providing a plurality of output signals to operate a video camera capable of a plurality of different functions, said system comprising:
(a) input means for providing a plurality of different level voltage signals;
(b) a plurality of first switch means coupled to receive said voltage signals from said input means, each of said first switch means including a zener diode, each of said zener diodes being selected so as to pass current at a different breakdown voltage level and each zener diode being coupled to receive the voltage signal from said input means so as to be activated thereby so that each of said first switch means is activated when the voltage signal is above a corresponding predetermined level with the predetermined level for each of said first switch means being differend and each of said first switch means providing at its respective output a first switching signal upon being activated;
(c) a plurality of blocking means, each being coupled to the output of a respective one of said first switch means except for said first switch means corresponding to the lowest level input signal and each of said blocking means providing a blocking signal upon receiving a first switching signal from the corresponding said first switch means;
(d) a plurality of second switch means, each being actuated by a corresponding one of said first switch means and said blocking means associated with said first switch means that is to be activated by the next higher level input signal, each of said second switch means providing at its output a second switching signal upon receiving a first switching signal from the corresponding said first switch means unless said second switch means also receives a blocking signal from the associated blocking means; and
(e) a plurality of output means for selectively controlling the different functions of the video camera, each of said output means being coupled to the output of one of said second switch means and enabling one of the control functions of the video camera when receiving a second switching signal from the corresponding said second switch means.

12. A system as defined in claim 11, wherein said input means includes:
a plurality of zener diodes corresponding in number to said first switch means and having the same breakdown voltage levels as the zener diodes of said first switch means; and
input switch means for selectively applying a reverse bias across each of said zener diodes of said input means to generate the different level voltage signals.

13. A video camera control system as defined in claim 1 or 11 wherein said means for selectively controlling the different functions of the video camera including positioning means for moving the camera into one of a plurality of preselected positions.

14. A video camera control system as defined in claim 13 wherein said positioning means includes contact means for limiting the movement of the video camera in each direction of movement.

15. A video camera control system as defined in claim 14 wherein said contact means includes a plurality of predisposed magnetic contact members and corresponding contact members mounted on the video camera so that upon movement of the camera when one of said predisposed magnetic contact members comes into contact with a corresponding contact member on the camera further movement of the camera will be interrupted.

* * * * *